(12) United States Patent
Kishigami et al.

(10) Patent No.: US 8,504,108 B2
(45) Date of Patent: *Aug. 6, 2013

(54) BASE STATION APPARATUS, TRANSMISSION SIGNAL GENERATING METHOD, MOBILE STATION APPARATUS, AND RECEPTION METHOD

(75) Inventors: Takaaki Kishigami, Osaka (JP); Yoichi Nakagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 39 days.

This patent is subject to a terminal disclaimer.

(21) Appl. No.: 13/559,481

(22) Filed: Jul. 26, 2012

(65) Prior Publication Data

US 2012/0300704 A1 Nov. 29, 2012

Related U.S. Application Data

(63) Continuation of application No. 13/042,206, filed on Mar. 7, 2011, now Pat. No. 8,260,358, which is a continuation of application No. 11/573,536, filed as application No. PCT/JP2005/013849 on Jul. 28, 2005, now Pat. No. 7,929,994.

(30) Foreign Application Priority Data

Aug. 11, 2004 (JP) ................................. 2004-234523
Jul. 15, 2005 (JP) ................................. 2005-207800

(51) Int. Cl.
*H04M 1/00* (2006.01)
(52) U.S. Cl.
USPC ..... 455/561; 455/562; 455/67.11; 455/67.13; 455/436; 370/328; 370/331
(58) Field of Classification Search
USPC ........... 455/561, 562, 67.11, 67.13, 436–442; 370/328, 331
See application file for complete search history.

(56) References Cited

U.S. PATENT DOCUMENTS

| 5,828,659 | A | 10/1998 | Teder |
| 6,633,553 | B1 | 10/2003 | Hwang |
| 7,042,858 | B1 | 5/2006 | Ma |
| 7,447,189 | B2 | 11/2008 | Jou |
| 2001/0053141 | A1 | 12/2001 | Periyalwar |

(Continued)

FOREIGN PATENT DOCUMENTS

| JP | 3296822 | 1/1996 |
| JP | 2000-333231 | 11/2000 |

(Continued)

OTHER PUBLICATIONS

International Search Report dated Nov. 1, 2005.

(Continued)

*Primary Examiner* — Temica M Beamer
(74) *Attorney, Agent, or Firm* — Dickinson Wright PLLC (57) ABSTRACT

A communication system has a base station control device and base station devices. The base station control device totalizes information on the number of base stations as the number of base station devices which can communicate with a mobile station device, makes Nb copies of a data frame, successively assigns integer values from 1 to Nb as stream numbers Ns to the data frames copied, and forms Nb copied data frames including Nb and Ns in header information. Copied data frames having different Ns in the header information are sent to base station devices. According to Ns and Nb, a base station device subjects the data in the copied data frame to temporal/spatial encoding to form a temporal/spatial encoding series. A mobile station device receives the temporal/spatial encoding series signal from each of the base station devices.

13 Claims, 7 Drawing Sheets

U.S. PATENT DOCUMENTS

2002/0012334 A1    1/2002    Strawczynski
2005/0213538 A1    9/2005    Ebiko

FOREIGN PATENT DOCUMENTS

| | | |
|---|---|---|
| JP | 2002-217827 | 8/2002 |
| JP | 2003-338809 | 11/2003 |
| JP | 2004-007279 | 1/2004 |
| JP | 2004-040232 | 2/2004 |
| JP | 2004-064240 | 2/2004 |
| JP | 2004-072624 | 3/2004 |

OTHER PUBLICATIONS

3GPP TS 25.427 v5.4.0, Technical Specification, 3rd Generation Partnership Project; Technical Specification Group Radio Access Network, UTRAN Iub/Iur interface user plane protocol for DCH data streams (Release 5), www.3gpp.org, Valbonne, France, pp. 1-35, Mar. 2005.

Branka Vucetic, et al., "Space-Time Coding," John Wiley & Sons, Ltd., ISBN: 0-470-84757-3, 22 pages total, 2003.

S. Alamouti, "A Simple Transmit Diversity Technique for Wireless Communications," IEEE Journal on Select Areas in Communications, vol. 16, No. 8, pp. 1451-1458, Oct. 1998.

A. Paulraj, et al., "Introduction to Space-Time Wireless Communications," Cambridge University Press, ISBN: 0 521 82615 2, 17 pages total, 2003.

K. Lee, et al., "A Space-Frequency Transmitter Diversity Technique for OFDM Systems," IEEE Globecom, vol. 3, pp. 1473-1477, 2000.

Japanese Notice of the Reasons for Rejection dated Sep. 28, 2010.

(PRIOR ART)

BASE STATION APPARATUS, TRANSMISSION SIGNAL GENERATING METHOD, MOBILE STATION APPARATUS, AND RECEPTION METHOD

This is a continuation application of application Ser. No. 13/042,206 filed Mar. 7, 2011, which is a continuation application of application Ser. No. 11/573,536 filed Feb. 9, 2007, which is a national stage of PCT/JP2005/013849 filed Jul. 28, 2005, which is based on Japanese Application No. 2004-234523 filed Aug. 11, 2004 and Japanese Application No. 2005-207800 filed Jul. 15, 2005, the entire contents of each of which are incorporated by reference herein.

TECHNICAL FIELD

The present invention relates to a communication system, to a base station control apparatus, and to a base station apparatus, and particularly relates to a base station apparatus, to a base station control apparatus for controlling the base station apparatus, and to a communication system that is provided with a plurality of base station apparatuses and base station control apparatuses.

BACKGROUND ART

A conventional radio communication system that has a base station control apparatus uses a macrodiversity technique to obtain diversity effects by transmitting data in the same path from a plurality of base station apparatuses to a certain mobile station apparatus. In a radio communication system that uses the CDMA (Code Division Multiple Access) system in IMT-2000, a diversity communication technique is introduced whereby a base station control apparatus transmits sound, packets, control information, and other signals to a single mobile station apparatus via a plurality of base station apparatuses. This technique ensures high-quality communication through a diversity benefit that is obtained by a process in which the transmission signal is duplicated in the base station control apparatus, and the duplicated transmission signal is transmitted in parallel to the plurality of base station apparatuses via a plurality of wire transmission lines, and then transmitted from the plurality of base station apparatuses to the mobile station apparatus via a radio propagation channel.

Figure 1:
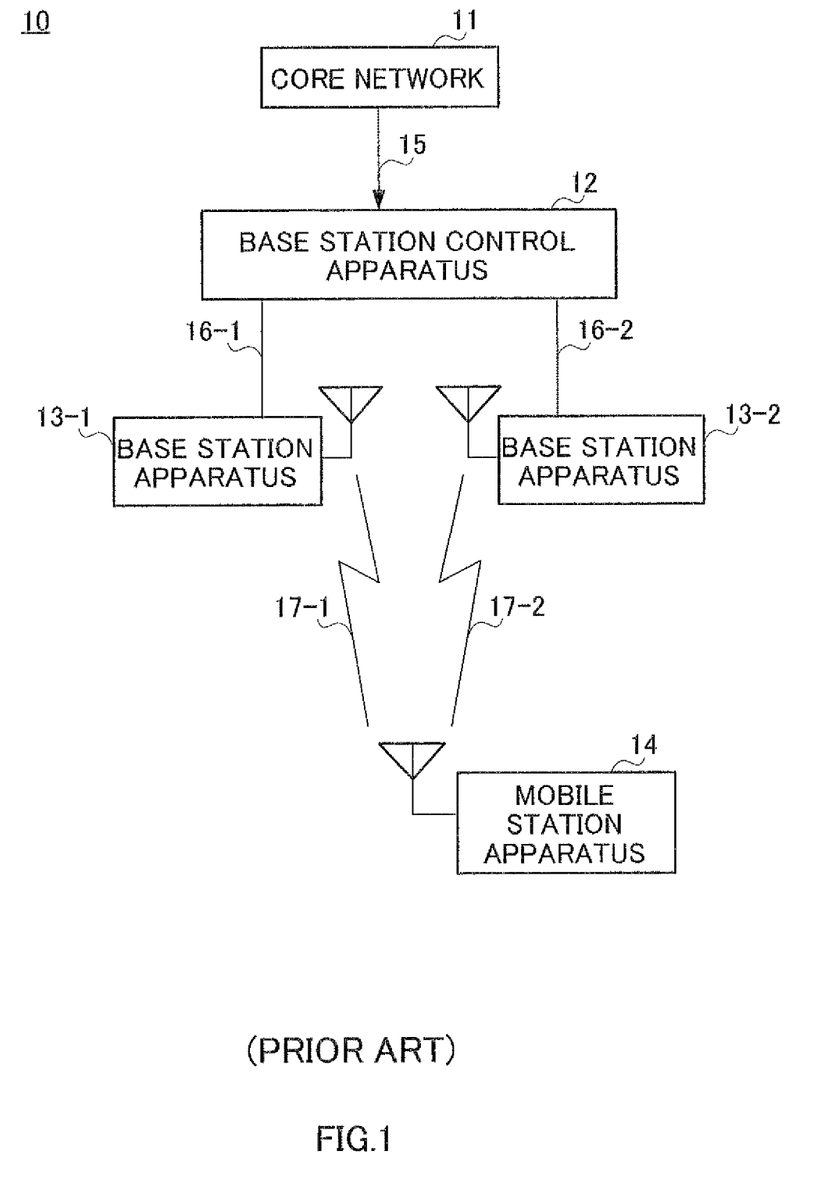
FIG. 1 is a diagram showing the overall structure of the conventional radio communication system.

FIG. 1 is a block diagram showing the structure of the conventional radio communication system 10. As shown in FIG. 1, the conventional radio communication system 10 has a core network 11, base station control apparatus 12, a plurality of base station apparatuses 13-1, 13-2, and mobile station apparatus 14. The system has the same structure when there are two or more base station apparatuses 13.

Core network 11 and base station control apparatus 12 are connected by wire transmission line 15, and each of the plurality of base station apparatuses 13-1, 13-2 is independently connected to base station control apparatus 12 by wired transmission lines 16-1, 16-2, respectively. Mobile station apparatus 14 also communicates with the plurality of base station apparatuses 13-1, 13-2 via radio propagation channel 17-1, 17-2, respectively.

Following is a description of the operations that occur when data are transmitted from core network 11 to mobile station apparatus 14 in the type of structure described above.

First, core network 11 transmits a data frame to base station control apparatus 12 via wired transmission line 15. Base station control apparatus 12 that receives the data frame duplicates the received data frame for transmission to the plurality of base station apparatuses 13-1, 13-2 and transmits the duplicated data frame to base station apparatuses 13-1, 13-2 via wired transmission lines 16-1, 16-2, respectively.

The plurality of base station apparatuses 13-1, 13-2 adds control information to the received data frames to form radio frames, and transmits the radio frames to mobile station apparatus 14 via radio propagation channels 17-1, 17-2.

Next, in mobile station apparatus 14, the transmission lag in radio propagation channels 17-1, 17-2 between the received radio frames is corrected, the phases of the radio frames are aligned, the radio frames are synthesized, and the received data are reconstructed from the synthesized signals.

In the conventional radio communication system 10 described above, higher quality communication is achieved by causing mobile station apparatus 14 to receive the same data frames via a plurality of radio propagation channels 17-1, 17-2. Even when phasing or another factor is in effect, e.g., when the propagation environment of the first radio propagation channel 17-1 has deteriorated, higher quality communication can still be achieved by synthesizing the data frame received via the other radio propagation channels 17-2.

Non-patent Document 1: 3GPP TS 25.427 UTRAN Iubaur Interface User Plane Protocol For DCH Data Streams

DISCLOSURE OF INVENTION

Problems to be Solved by the Invention

However, signals transmitted from a plurality of base stations in the conventional communication system are sometimes in a phase relationship in which the signals cancel each other out under some conditions of the propagation path. In this case, adequate characteristics are not obtained, and the communication quality is inadequate. The conventional communication system also has drawbacks in that an adequate reception level is not obtained in the mobile station apparatus at cell edges that are distant from the base station apparatus.

An object of the present invention is to provide a communication system, a base station control apparatus, and a base station apparatus that improve communication quality.

Means for Solving the Problem

A first aspect of the present invention resides in a communication system comprising a base station control section including a copying section that forms N (a natural number equal to 2 or higher) sets of copied data by copying transmission data, a control information addition section that adds control information relating to channel encoding to a header portion of each set of copied data, and a transmission section that transmits to separate base station apparatus each of the sets of copied data the control information is added to; and base station apparatuses that each have a control information extraction section that extracts the control information from the copied data, and an encoding section that forms an encoding series signal for which channel encoding is performed according to the extracted control information.

A second aspect of the present invention resides in a base station apparatus comprising a control information extraction section for extracting control information relating to channel encoding from a header portion of a data frame; a pilot symbol addition section that adds a known pilot symbol to a transmission signal; and an encoding section that forms, according to the extracted control information, an encoding series signal from the transmission signal that includes a pilot signal.

A third aspect of the present invention resides in a base station control apparatus comprising a copying section that forms N sets of copied data by copying transmission data, a control information addition section that adds control information to a header portion of each set of copied data, and a transmission section that transmits, to separate base station apparatus, each of the sets of copied data the control information is added to.

Advantageous Effect of the Invention

The present invention provides a communication system, a base station control apparatus, and a base station apparatus that are capable of improving communication quality.

BEST MODE FOR CARRYING OUT THE INVENTION

Embodiments of the present invention will be described in detail hereinafter with reference to the accompanying drawings. The same reference symbols are used to indicate structural elements that are the same in the embodiments, and no redundant descriptions of these elements are given.

Embodiment 1

Figure 2:
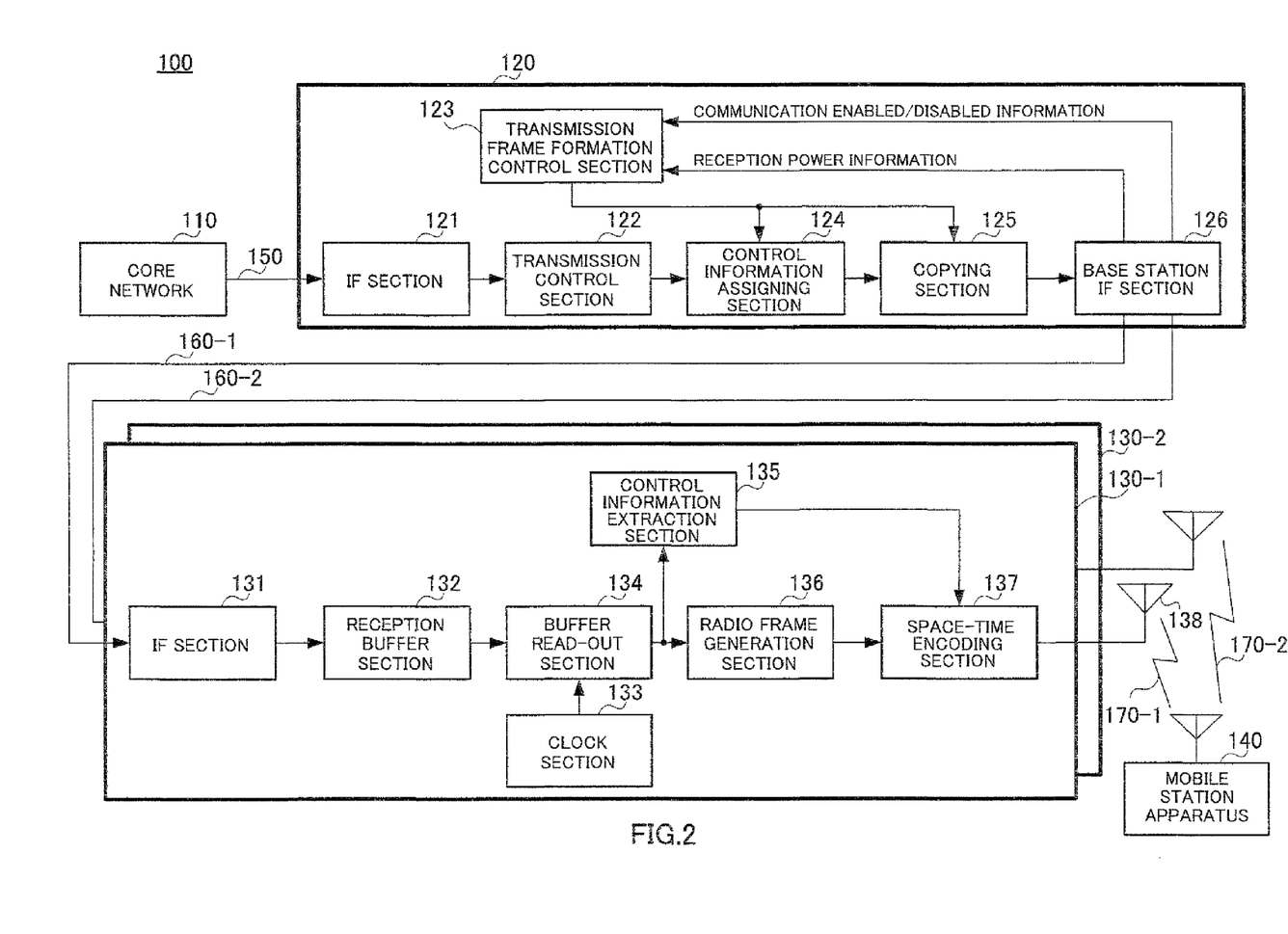
FIG. 2 is a block diagram showing the structure of the radio communication system according to Embodiment 1 of the present invention.

As shown in FIG. 2, the radio communication system 100 of the present embodiment is provided with core network 110, base station control station apparatus 120, a plurality of base station apparatuses 130-1, 130-2, and mobile station apparatus 140. In the embodiments, cases are described in which the number Nc of base station apparatuses provided to the radio communication system is 2, but the same structure is formed when the Nc is greater than 2.

Core network 110 and base station control station apparatus 120 are connected by wired transmission line 150, and each of the plurality of base station apparatuses 130-1, 130-2 is independently connected to base station control apparatus 120 by wired transmission lines 160-1, 160-2, respectively.

Further, mobile station apparatus 140 communicates with the plurality of base station apparatuses 130-1, 130-2 via radio propagation channels 170-1, 170-2, respectively.

Base station control apparatus 120 is provided with IF (interface) section 121, transmission control section 122 provided to a user channel unit, transmission frame formation control section 123, control information assigning section 124, copying section 125, and base station IF section 126.

IF section 121 receives data that are transmitted from core network 110 via wired transmission line 150, and extracts a data frame from the received data.

Transmission control section 122 outputs the data frame extracted by IF section 121 to control information assigning section 124 each time a pre-set time period elapses. When there is no data frame to be outputted, information indicating the absence of data is outputted.

Transmission frame formation control section 123 communicates with base station apparatuses 130, acquires communication enabled/disabled information from each of base station apparatuses 130 via base station IF section 126, totalizes base station number information Nb that indicates the number of base station apparatuses 130 capable of communicating with mobile station apparatus 140, outputs the base station number information Nb to control information assigning section 124 and copying section 125, and outputs base station apparatus identification information of base station apparatuses 130 capable of communicating with mobile station apparatus 140 to copying section 125.

Control information assigning section 124 adds the base station number information Nb from transmission frame formation control section 123 as header information to the data frame transmitted from transmission control section 122, and outputs to copying section 125 the data frame thus added to.

Copying section 125 makes a number of copies equal to Nb of the data frame outputted from control information assigning section 124 on the basis of the base station number information Nb from transmission frame formation control section 123. Stream numbers Ns that are integers from 1 to Nb are assigned in sequence to the Nb copied data frames. The stream number Ns assigned to each copied data frame is included in (added to) each set of header information, each set of base station identification information from transmission frame formation control section 123 is also added to each copied data frame, and the data frames thus added to are outputted to base station IF section 126. Specifically, copying section 125 functions not only a section that copies data, but also as a section that adds control information. The stream number Ns is used when a radio frame is generated in base station apparatus 130.

Base station IF section 126 transmits each of the Nb copied data frames as wired transmission frames via wired transmission lines 160 to base station apparatus 130 that is indicated by the base station identification information added to each copied data frame.

When transmission frame formation control section 123 outputs information indicating that there are no data frames to be outputted, control information assigning section 124 transmits to copying section 125 only the header information the base station number information Nb is added to. Copying section 125 makes a number of copies equal to Nb of the header information, includes in each set of header information the stream number Ns assigned to each set of header information, and adds each set of base station identification information from transmission frame formation control section 123 to each copied set of header information. The sets of header information thus added to are outputted to base station IF section 126. Base station IF section 126 transmits, as wired transmission frames, copied data frames that have only header information and no data body.

A base station apparatus 130 is provided with IF section 131, reception buffer section 132 for buffering a copied data frame for each user channel, clock section 133, buffer read-out section 134 for reading out a copied data frame for each user channel in synchrony with clock section 133, control information extraction section 135 for extracting control information from a copied data frame, radio frame generation section 136, and space-time encoding section 137.

IF section 131 transmits a wired transmission frame (copied data frame in this instance) received via wired transmission line 160 to reception buffer section 132.

Reception buffer section 132 stores the copied data frame from IF section 131.

Clock section 133 generates a clock signal that is synchronized with a clock in transmission control section 122 of base station control apparatus 120, and feeds the clock signal to buffer read-out section 134.

Buffer read-out section 134 reads the copied data frame stored in reception buffer section 132 in synchrony with the clock signal from clock section 133, and transmits the copied data frame to control information extraction section 135 and radio frame generation section 136.

Control information extraction section 135 extracts the base station number information Nb and the stream number Ns from the control information included in the header of the copied data frame from buffer read-out section 134, and transmits the base station number information Nb and the stream number Ns to space-time encoding section 137.

Radio frame generation section 136 deletes the header information of the copied data frame that was transmitted from buffer read-out section 134, extracts the data body, adds a prescribed pilot symbol and control information used for the radio propagation channel to the data body, and generates a radio frame. The radio frame is transmitted to space-time encoding section 137.

Radio frame generation section 136 does not generate a radio frame when the copied data frame from buffer read-out section 134 is composed of only header information and no data body. Accordingly, a radio frame is not transmitted to mobile station apparatus 140 in this case.

space-time encoding section 137 performs the following operations using the output (stream number Ns and the information Nb indicating the number of communication-enabled base stations) of control information extraction section 135 and the output of radio frame generation section 136.

space-time encoding section 137 does not perform space-time encoding for an inputted radio frame when the base station number information Nb outputted from control information extraction section 135 is 1. Accordingly, after a prescribed communication path encoding is performed for transmission in a radio propagation channel, the radio frame is modulated according to a prescribed modulation method, converted to a radio frequency band, and transmitted from antenna 138.

When the base station number information Nb outputted from control information extraction section 135 is 2 or higher, space-time encoding section 137 performs communication path encoding of the inputted radio frame according to the stream number Ns to form a space-time encoding series. The stream number Ns and the encoding method herein are determined in advance on the basis of a prescribed method of generating a space-time code. A method that can be adaptively varied according to the condition of the radio communication path may also be applied with regard to the modulation method and the encoding ratio used during encoding.

The space-time block code, space-time trellis code, space-time turbo code, and other techniques and combinations of techniques described in the reference B. Vucetic and J. Yuan, "Space-Time Coding," John Wiley & Sons Ltd., may be applied in the space-time encoding performed in radio communication system 100.

An interleaver may also be applied along an appropriate frame length in each of base station apparatuses 130. In this case, a common interleaver must be used for all of base station apparatuses 130.

A case will be described herein in which the space-time block code applied in radio communication system 100 is based on the reference S. M. Alamouti, "A simple transmit diversity technique for wireless communications," IEEE Journal Select. Areas Commun., Vol. 16, No. 8, pp. 1451-1458, October 1998. The particular case described herein is one in which the base station number information Nb is 2.

When the base station number information Nb is 2, the stream number Ns is 1 or 2. When space-time encoding section 137 uses an M-value modulation method, radio frames are grouped for every $\log_2 M$ bits. When the stream number Ns outputted from control information extraction section 135 is 1, space-time encoding section 137 performs space-time encoding to form the space-time encoding series $S(2m-1)$, $-S(2m)^*$ wherein $m=1, \ldots, K/2$). When the stream number Ns outputted from control information extraction section 135 is 2, space-time encoding is performed to form the space-time encoding series $S(2m)$, $S(2m-1)^*$ (wherein in $1, \ldots, K/2$). The modulation symbol for the results of modulation herein is $S(k)$ (wherein $k=1, \ldots, K$), and the symbol "*" represents the phase-conjugation operator in the complex phase plane.

When a space-time trellis code or a space-time turbo code is applied in radio communication system 100, space-time encoding can be achieved by performing trellis encoding using a different generator matrix for each stream number.

The space-time encoding series that is space-time encoded in space-time encoding section 137 in this manner is subjected to a prescribed modulation, converted to a radio frequency band, and transmitted from antenna 138 to mobile station apparatus 140.

Mobile station apparatus 140 receives the plurality of space-time encoded space-time encoding series that is transmitted from the plurality of base station apparatuses (base station apparatus 130-1 and base station apparatus 130-2 herein).

The following routine is executed between base station apparatus 130 and mobile station apparatus 140 as a routine that is executed before the radio frame is received. Specifically, base station apparatus 130-1 or base station apparatus 130-2 first uses a control channel to notify mobile station apparatus 140 in advance of the frame timing and the identification information of base station apparatus 130 for performing the space-time encoding. Upon completing preparation for receiving the frame that corresponds to the space-time encoding transmission notification from base station apparatus 130, mobile station apparatus 140 notifies base station apparatus 130 that is the transmission source of notice of the base station identification information that preparation for reception is completed using a control channel. The system of reception in mobile station apparatus 140 is thus prepared.

When reception of the radio frame is initiated, mobile station apparatus 140 performs channel estimation from base station apparatuses 130 to mobile station 140 on the basis of a known pilot signal series transmitted from base station apparatuses 130. Mobile station apparatus 140 then decodes the plurality of received radio frames using the channel estimation values hj (wherein j=1, ..., Nb) obtained by channel estimation.

The specific method of receiving the signal that is encoded by space-time block encoding, space-time trellis encoding, space-time turbo encoding, or another technique or combination of the aforementioned techniques is described, for example, in B. Vucetic, J. Yuan, "Space-Time Coding," John Wiley & Sons Ltd., and will not be described herein.

In radio communication system 100, the base station number information Nb and the stream number Ns are included in the header of each wired transmission frame in base station control apparatus 120 and are transmitted to base station apparatuses 130, but the present invention is not limited to this configuration. A configuration may also be adopted in which the pair composed of the stream number Ns and the number Nb of base stations that can communicate is correlated with pair identification information, and the pair identification information is included in the header of the wired transmission frame and transmitted to base station apparatuses 130. In this case, a table in which the pairs of base station numbers Nb and stream numbers Ns are correlated with pair identification information must be stored in advance in base station apparatuses 130. Control information extraction section 135 extracts the pair identification information included in the header of a sub-data frame that is outputted from buffer read-out section 134, references the abovementioned table using the pair identification information as a key, and outputs the corresponding base station number Nb and stream number Ns to space-time encoding section 137.

In radio communication system 100, base station control apparatus 120 and the plurality of base station apparatuses 130 perform synchronized transmission operations, but the radio propagation channel between the plurality of base station apparatuses 130 and mobile station apparatus 140 generally is different. Therefore, a difference occurs in the time at which the transmission signals from the plurality of base station apparatuses 130 reach mobile station apparatus 140.

Since the characteristics of the space-time encoding are expected to deteriorate when the time difference can no longer be ignored with respect to the symbol interval, base station control apparatus 120 controls the reception tuning among base station apparatuses 130 so that the timing at which the space-time encoding series transmitted from each of base station apparatuses 130 are received by mobile station apparatus 140 is within a prescribed time difference. It is thereby possible to prevent the abovementioned characteristics from deteriorating due to deviations in the reception timing.

As a method for placing the reception timing of the space-time encoding series within a prescribed time difference in mobile station apparatus 140, the timing at which radio frames are transmitted is synchronized between base station apparatus 130-1 and base station apparatus 130-2, in which case mobile station apparatus 140 transmits the same signal to base station apparatus 130-1 and to base station apparatus 130-2 and detects the difference in the timing at which the signals reach base station apparatus 130-1 and base station apparatus 130-2. The timing of reception in mobile station apparatus 140 can then be placed within the prescribed time difference by controlling the timing at which base station IF section 126 of base station control apparatus 120 sends copied data frames to base station apparatuses 130 based on the timing difference detected in base station apparatus 130.

The method disclosed in Japanese Patent No. 3296822 that uses a transmission signal in a downlink may also be used to detect a transmission time difference between base stations.

Figure 3:
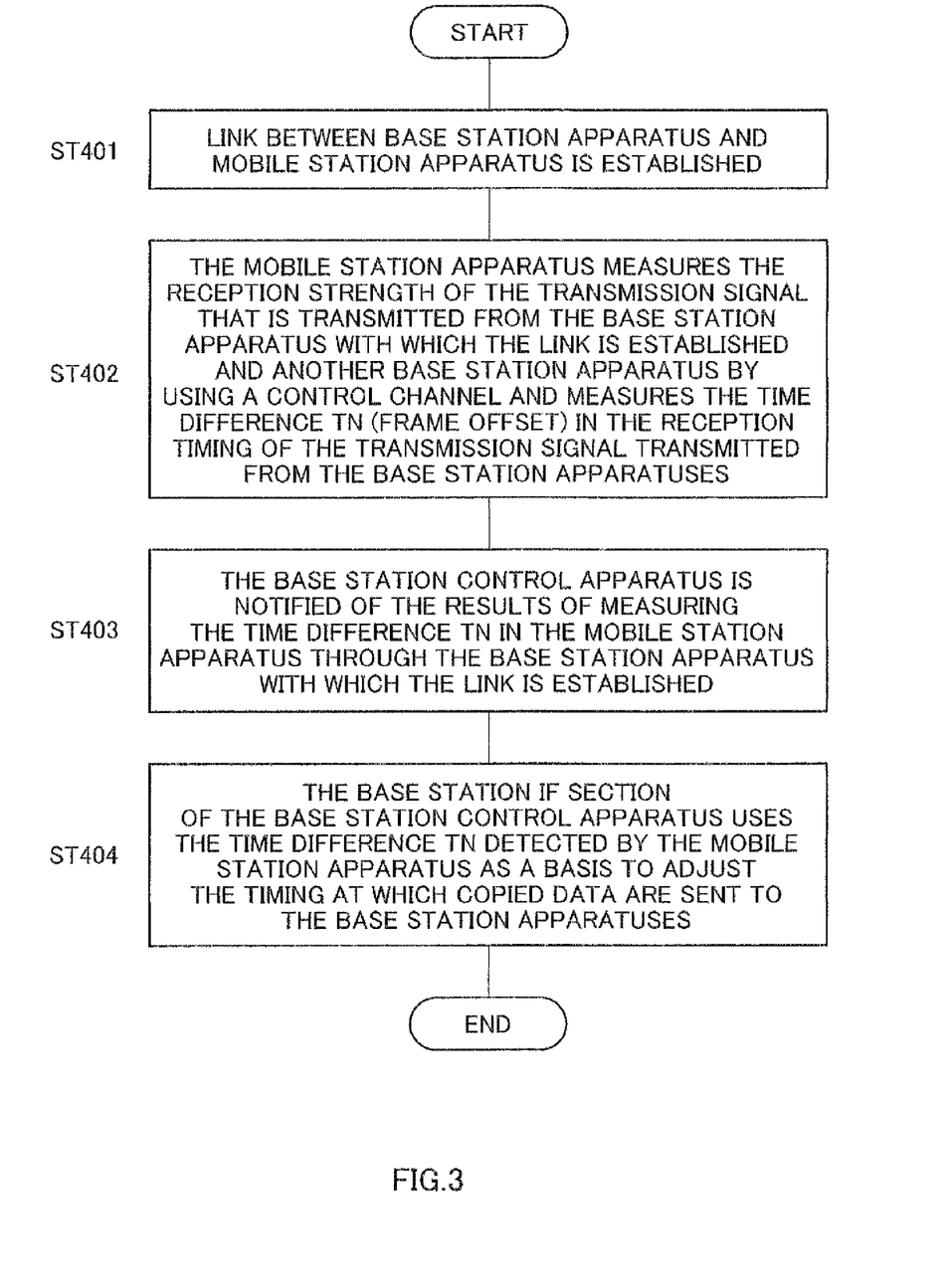
FIG. 3 is a diagram showing the control flow relating to detection of the transmission time difference between base station apparatuses when a downlink transmission signal transmitted from the base station apparatuses to a mobile station apparatus is used as the transmission signal.

FIG. 3 is a diagram showing the control flow relating to detection of the transmission time difference between base station apparatuses when a downlink transmission signal transmitted from base station apparatuses 130 to mobile station apparatus 140 is used as the transmission signal.

Base station apparatus 130-1 or base station apparatus 130-2 first establishes a link to mobile station apparatus 140 (step ST401).

Mobile station apparatus 140 then measures the reception strength of the transmission signal that is transmitted from base station apparatus 130-1 and base station apparatus 130-2 by using a control channel, and measures the time difference T (frame offset) in the reception timing of the transmission signal transmitted from both base station apparatuses (step ST402). The control channel is a shared control channel that is constantly broadcasted by base station apparatuses 130.

Notification of the results of measuring the tune difference Tn in mobile station apparatus 140 is then issued to base station control apparatus 120 through base station apparatus 130-1 or base station apparatus 130-2 with which the link is established (step ST403). The reception timing in mobile station apparatus 140 can be placed within the prescribed time difference by using the time difference Tn detected by mobile station apparatus 140 as a basis for adjusting (step ST404) the timing at which base station IF section 126 of base station control apparatus 120 sends copied data frames to base station apparatuses 130.

In radio communication system 100, base station control apparatus 120 sets to a prescribed level the quality at which the transmission signal transmitted from the plurality of base station apparatuses (base station apparatus 130-1 and base station apparatus 130-2 in this case) is received in mobile station apparatus 140, and performs control so that the difference in the reception level is within a prescribed level difference. Radio frames transmitted from base station apparatuses 130 can thereby be decoded with good precision in mobile station apparatus 140. As a result, communication quality in radio communication system 100 can be enhanced.

For example, control is made possible by providing feedback to base station apparatuses 130 of information relating to the quality and level at which the transmission signal transmitted from base station apparatuses 130 is received in mobile station apparatus 140.

Figure 4:
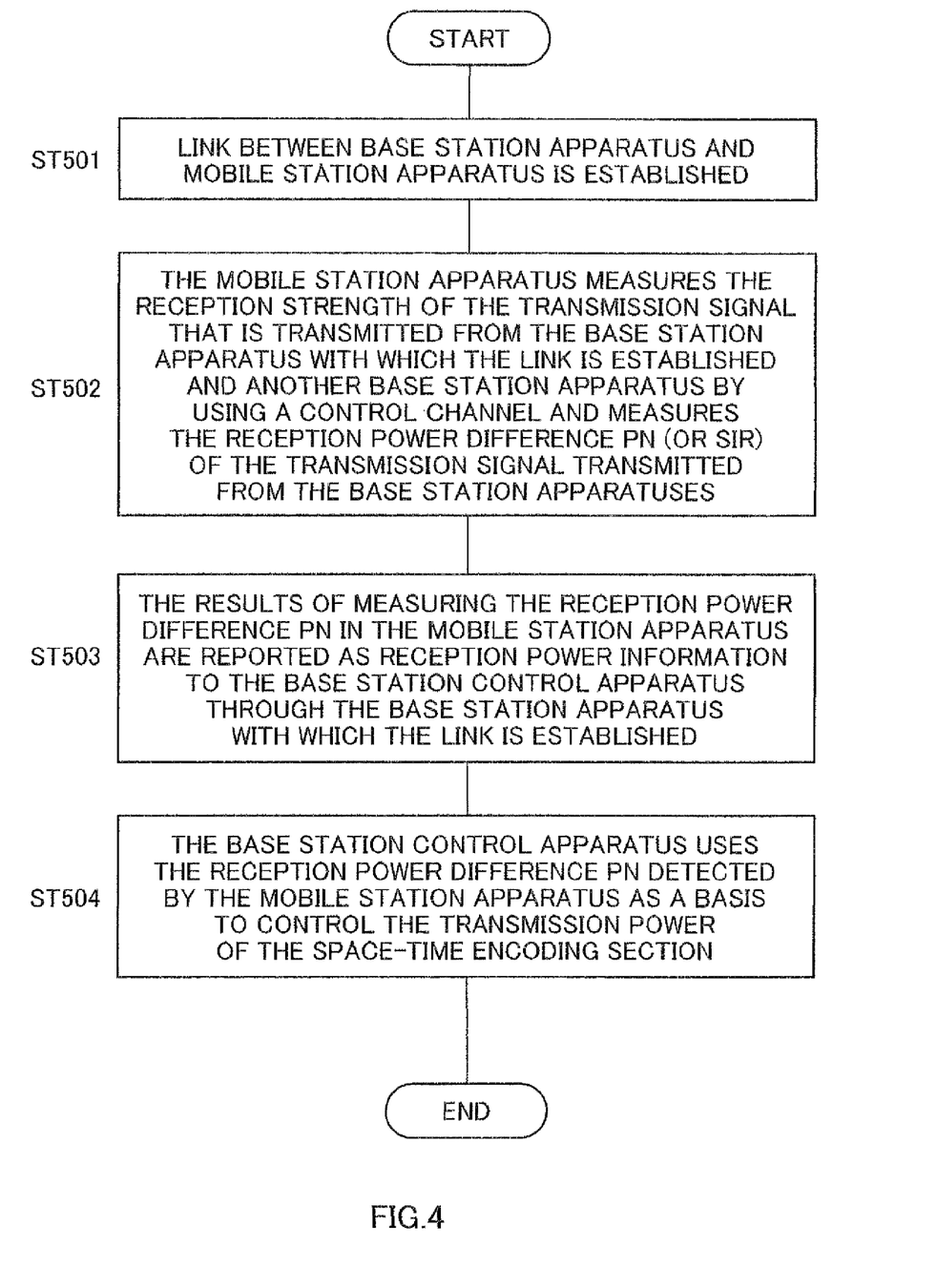
FIG. 4 is a diagram showing the control flow relating to detection of the reception level and reception quality when a downlink transmission signal transmitted from the base station apparatuses to a mobile station apparatus is used as the transmission signal.

FIG. 4 is a diagram showing the control, flow relating to detection of the reception level and reception quality when a downlink transmission signal transmitted from base station apparatuses 130 to mobile station apparatus 140 is used as the transmission signal.

Base station apparatus 130-1 or base station apparatus 130-2 first establishes a link to mobile station apparatus 140 (step ST501).

Mobile station apparatus 140 then measures the reception strength of the transmission signal that is transmitted from base station apparatus 130-1 and base station apparatus 130-2 by using a control channel, and measures the reception power difference PD. (or SIR) of the transmission signal transmitted from both base station apparatuses (step ST502). The control channel is a shared control channel that is constantly broadcasted by base station apparatuses 130.

Notification of the results of measuring the reception power difference Pn in mobile station apparatus 140 is then issued to base station control apparatus 120 through base station apparatus 130-1 or base station apparatus 130-2 with which the link is established (step ST503). The reception quality in mobile station apparatus 140 can be placed within the prescribed level, and the difference in the reception level can be placed within the prescribed level difference by using the reception power difference Pn detected by mobile station apparatus 140 as a basis upon which base station control apparatus 120 controls (step ST504) the transmission power of space-time encoding section 137 of each of base station apparatuses 130.

In radio communication system 100 of the present embodiment, the base station number information Nb that is the number of base station apparatuses 130 capable of communicating with mobile station apparatus 140 is totalized in base station control apparatus 120, a number of copies equal to Nb are made of a data frame, an integer from 1 to Nb is assigned in sequence as a stream number Ns to each copied data frame, and a number of copied data frames equal to Nb are formed that include the Nb and the Ns in header information. A copied data frame having a difference Ns in the header information is then transmitted to each of base station apparatuses 130 capable of communicating with mobile station apparatus 140. In base station apparatuses 130, the data bodies of the copied data frames are space-time encoded to form a space-time encoding series on the basis of the Ns and Nb included in the copied data frames that are acquired from base station control apparatus 120.

Specifically, in radio communication system 100, according to the present embodiment, base station control apparatus 120 forms the base station number information Nb (a natural number equal to 2 or greater) of data frames that is the number of base station apparatuses 13 capable of communicating with mobile station apparatus 140 by copying, adds a parameter N and a stream number Ns (any integer from 1 to N) that is assigned to each set of copied data to the header portions of the copied data frames, for transmission to separate base station apparatuses 130 as the radio frames. Each of base station apparatuses 130 extracts the parameter N and the stream number Ns from the radio frame, and forms a space-time encoding series signal that corresponds to the extracted parameter N and stream number Ns. Mobile station apparatus 140 then receives a space-time encoding series signal from each of base station apparatuses 130.

Accordingly, since each of base station apparatuses 130 forms a space-time encoding series on the basis of the control information when base station control apparatus 120 adds the parameter Nb and the stream number Ns as control information, there is no need for processing to be performed by base station control apparatus 120 to form a space-time encoding series. Therefore, a plurality of different base station apparatuses 130 can be used to communicate using space-time encoding with a reduced processing load in base station control apparatus 120. Space-time encoded transmission is also performed in which mobile station apparatus 140 receives a space-time encoding series signal from each of base station apparatuses 130, whereby diversity effects are obtained, and communication quality can be enhanced. As a result, improved reception quality at cell edges can be anticipated.

The transmission signal that is transmitted by base station apparatuses 130 on the basis of control information from base station control apparatus 120 is a stream that is space-time encoded and transmitted between different base station apparatuses 130. Therefore, since the phase difference of each stream changes temporally, and the same phase is not maintained, locations at which the phases cancel each other out at the time of reception by mobile station apparatus 140 change temporally. As a result, the local dependence of the communication quality can be reduced.

Furthermore, in radio communication system 100 of the present embodiment, the timing at which the copied data frames are transmitted to base station apparatuses 130 is adjusted in base station control apparatus 120 so that the timing at which the space-time encoding series signals from base station apparatuses 130 are received in mobile station apparatus 140 is within the prescribed time difference.

Accordingly, the characteristics of the space-time-encoded transmission can be prevented from deteriorating due to deviations in the reception timing in mobile station apparatus 140.

In base station control apparatus 120 of radio communication system 100 of the present embodiment, a transmission power control signal, for controlling the transmission power of the encoding series signal is transmitted to base station apparatuses 130 on the basis of reception quality information from mobile station apparatus 140 for receiving the transmission signal transmitted from each of base station apparatuses 130.

Accordingly, radio frames transmitted from base station apparatuses 130 can thereby be decoded with good precision in mobile station apparatus 140. As a result, communication quality in radio communication system 100 can be enhanced.

Embodiment 2

Figure 5:
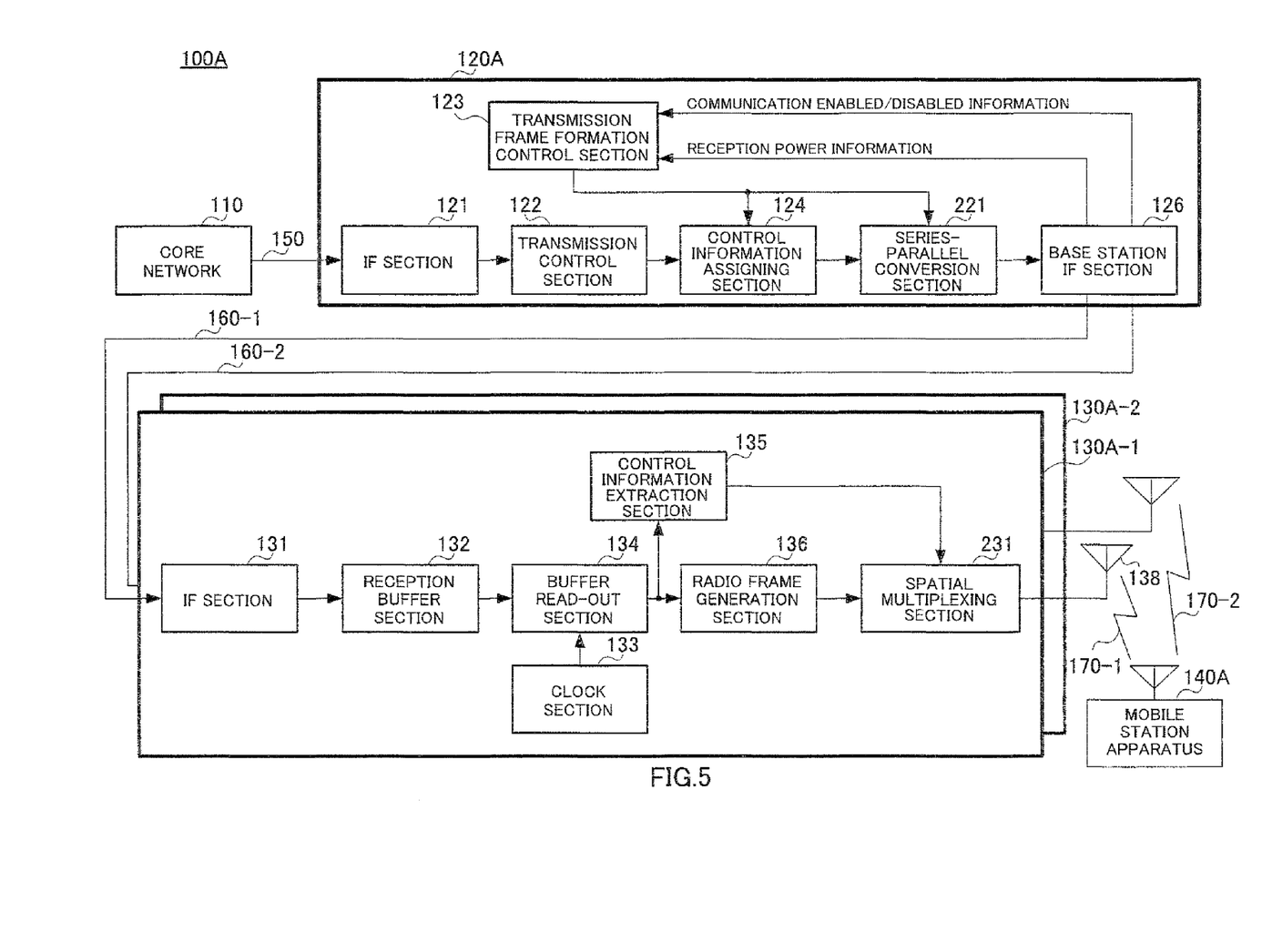
FIG. 5 is a block diagram showing the structure of the radio communication system according to Embodiment 2 of the present invention.

The radio communication system 100A according to Embodiment 2 shown in FIG. 5 has the same overall structure as radio communication system 100 shown in FIG. 2. However, the two systems are different in that base station control apparatus 120A has a series-parallel conversion section 221 instead of copying section 125 in base station control apparatus 120, and base station apparatuses 130A have spatial multiplexing section 231 instead of space-time encoding section 137 of base station apparatuses 130.

In base station control apparatus 120A, series-parallel conversion section 221 generates, on the basis of base station number information Nb from transmission frame formation control section 123, a number of sub-data frames equal to Nb by series/parallel conversion from data frames that are series data outputted from control information assigning section 124. Integers from 1 to Nb are then assigned in sequence as stream numbers Ns to the sub-data frames thus generated. The stream number assigned to each sub-data frame is included in the header information of each sub-data frame, each set of base station identification information outputted from transmission frame formation control section 123 is added to the corresponding sub-data frame, and the sub-data frames are outputted to base station IF section 126. The stream number Ns is used when a radio frame is generated in a base station apparatus and when a sub-data frame transmitted in parallel by spatial multiplexing transmission is decoded in mobile station apparatus 140A to the original series data frame.

Base station IF section 126 transmits each of the Nb sub-data frames as wired transmission frames via wired transmission line 160 to base station apparatus 130A that is indicated by the base station identification information added to the sub-data frames.

In base station apparatuses 130A, spatial multiplexing section 231 performs the following operations using the output (information Nb as to the number of base stations that can communicate) of control information extraction section 135 and the output of radio frame generation section 136.

spatial multiplexing section 231 does not perform spatial multiplexing transmission of the inputted radio frames when the base station number information Nb outputted from control information extraction section 135 is 1. Accordingly, after a prescribed communication path encoding is performed for transmission in a radio propagation channel, the radio frame is modulated according to a prescribed modulation method, converted to a radio frequency band, and transmitted from an antenna 138.

When the base station number information Nb outputted from control information extraction section 135 is 2 or higher, spatial multiplexing section 231 performs communication path encoding of the inputted radio frame.

The stream number Ns and the encoding method herein are determined in advance on the basis of a prescribed method of generating a space-time code. A method that can be adaptively varied according to the condition of the radio communication path may also be applied with regard to the modulation method and the encoding ratio used during encoding.

The radio frame that is communication-path encoded in spatial multiplexing section 231 in this manner is subjected to a prescribed modulation, converted to a radio frequency band, and transmitted from antenna 138 to mobile station apparatus 140A.

Each of the Nb sub-frames that are series-parallel converted in base station control apparatus 120A is thus transmitted from separate base station apparatus 130A to mobile station apparatus 140A, whereby a spatial multiplexing transmission such as MIMO (Multi Input Multi Output) can be achieved.

Mobile station apparatus 140A receives the plurality of radio frames that is transmitted from the plurality of base station apparatuses (base station apparatus 130A-1 and base station apparatus 130A-2 herein).

The following routine is executed between base station apparatus 130A and mobile station apparatus 140A as a routine that is executed before the radio frame is received. Specifically, base station apparatus 130A-1 or base station apparatus 130A-2 first uses a control channel to notify mobile station apparatus 140A in advance of the frame timing and the identification information of base station apparatus 130A that is transmitting the radio frame. Upon completing preparation for receiving the frame that corresponds to the notification from base station apparatus 130A, mobile station apparatus 140A notifies base station apparatus 130A that is the transmission source of base identification information that preparation for receiving is completed using a control channel. The system of reception in mobile station apparatus 140A is thus prepared.

When reception of the radio frame is initiated, mobile station apparatus 140A performs channel estimation from base station apparatuses 130A to mobile station 140A on the basis of a known pilot signal series transmitted from base station apparatuses 130A. Mobile station apparatus 140A then separately receives and decodes the plurality of received radio frames to obtain a plurality of sub-data frames through the use of maximum likelihood decoding, an interference canceller, or another method using the channel estimation values hj (wherein j=1, . . . , Nb) obtained by channel estimation. Decoding to the original series data frames is performed on the basis of the stream number Ns included in the header information of the plurality of sub-data frames.

The specific reception method is described in A. Paulraj, R. Nabar, and D. Gore, "Introduction to Space-Time Wireless Communications", Cambridge University Press, and will not be described herein.

In radio communication system 100A as well, the base station number information Nb and the stream number Ns are included in the header of each wired transmission frame in base station control apparatus 120A and transmitted to base station apparatuses 130A, but the present invention is not limited to this configuration. A configuration may also be adopted in which the pair composed of the stream number Ns and the number Nb of base stations that can communicate is correlated with pair identification information, and the pair identification information is included in the header of the wired transmission frame and transmitted to base station apparatuses 130A. In this case, a table in which the pairs of base station numbers Nb and stream numbers Ns are correlated with pair identification information must be stored in advance in base station apparatuses 130A. Control information extraction section 135 extracts the pair identification information included in the header of a sub-data frame that is outputted from buffer read-out section 134, references the abovementioned table using the pair identification information as a key, and outputs the corresponding base station number Nb and stream number Ns to spatial multiplexing section 231.

Similar to radio communication system 100, it is sometimes impossible in radio communication system 100A to ignore the difference in the times at which the transmission signals transmitted from the plurality of base station apparatuses 130A reach mobile station apparatus 140A with respect to the symbol timing, and the characteristics of the spatial multiplexing transmission are expected to deteriorate in this case. The characteristics of spatial multiplexing in radio communication system 100A can be prevented from deteriorating by applying the method described in Embodiment 1 whereby the reception timing of the radio frames is brought to within a prescribed time difference.

Radio communication system 100A may also utilize the method of control described in Embodiment 1 whereby the reception quality of the transmission signal transmitted from the plurality of base station apparatuses to mobile station apparatus 140A is brought to a prescribed level, and the difference in reception levels is brought to within a prescribed level difference.

In radio communication system 100A of the present embodiment, series data frames are converted to a parallel series to form a number of sub-data frames equal to Nb, an integer from 1 to Nb is assigned in sequence as a stream number Ns to each of the sub-frames, and Nb sub-frames in which the Nb and the Ns are included in (added to) header information are formed in base station control apparatus 120A. In base station apparatuses 130A, spatial-multiplex-transmitted frames are formed on the basis of sub-frames acquired from base station control apparatus 120A. The transmission frames transmitted from each of base station apparatuses 130A are received by mobile station apparatus 140A.

Because spatial multiplexing transmission can be performed between mobile station apparatus 140A and the plurality of base station apparatuses 130A, the transmission rate can be enhanced. As a result, throughput in radio communication system 100A can be enhanced.

In the description of Embodiment 2, a single stream for each base station apparatus is transmitted using a single antenna when spatial multiplexing transmission from communication-enabled base station apparatuses 130 is performed using a plurality of base station apparatuses. However, this configuration is not limiting, and when the communication-enabled base station apparatuses 130 have a plurality of antennas and can transmit a plurality of streams, a directional beam may also be formed to transmit the stream assigned to a certain base station apparatus 130. Improved communication quality can be anticipated by enhancing the directional gain in this manner.

The plurality of streams may also be transmitted from a single base station apparatus 130 after space-time encoding is performed. It is thereby possible to take advantage of the spatial degree of freedom of each of base station apparatuses 130 that can communicate, thereby resulting in an even further increase in the spatial diversity effect of transmission.

Embodiment 3

Figure 6:
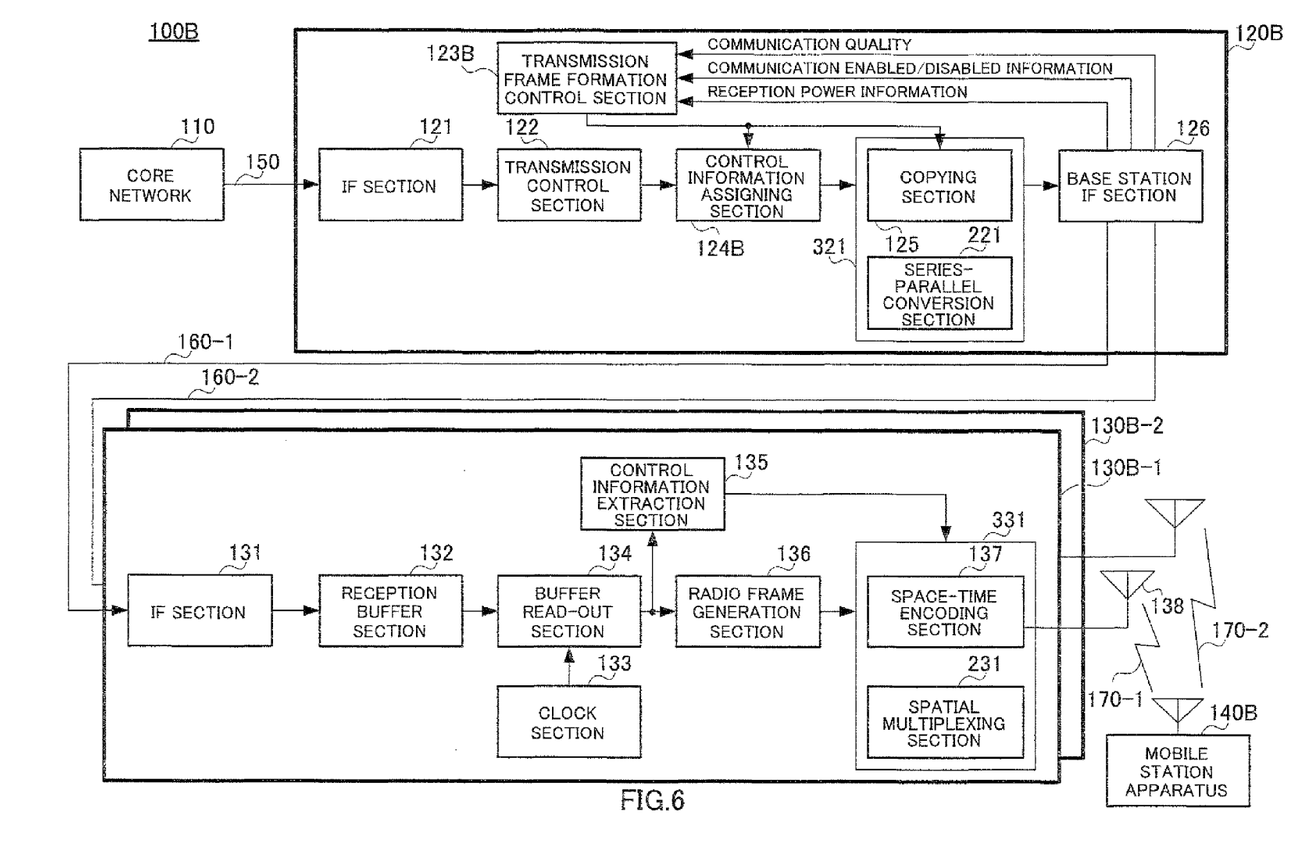
FIG. 6 is a block diagram showing the structure of the radio communication system according to Embodiment 3 of the present invention.

Radio communication system 100B of Embodiment 3 shown in FIG. 6 has the same overall structure as radio communication system 100 shown in FIG. 2. However, base station control apparatus 120B has frame formation section 321, and frame formation section 321 has series-parallel conversion section 221 in addition to copying section 125. Further, the base station apparatuses 130B have radio frame processing section 331, and radio frame processing section 331 has spatial multiplexing section 231 in addition to space-time encoding section 137.

Radio communication system 100B is characterized in switching space-time encoding transmission and spatial multiplexing transmission using the plurality of base station apparatuses 13013 according to the conditions of a wireless propagation channel between base station apparatuses 130B and mobile station apparatus 14013.

The operation of switching space-time encoding transmission and spatial multiplexing transmission in radio communication system 10013 will first be described.

Figure 7:
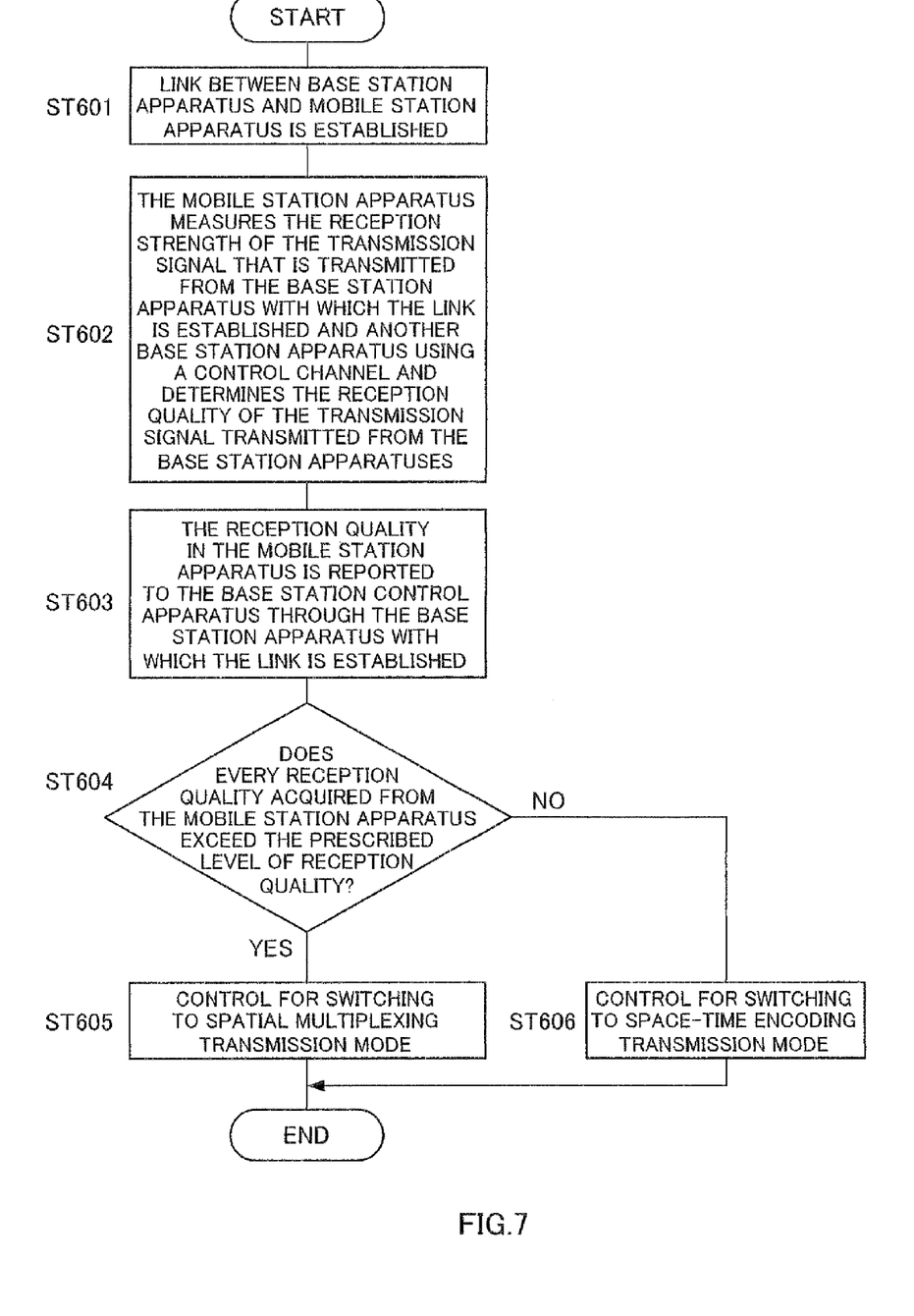
FIG. 7 is a flowchart showing the operation of switching space-time encoding transmission and spatial multiplexing transmission.

As shown in FIG. 7, base station apparatus 130B-1 or base station apparatus 130B-2 first establishes a link to mobile station apparatus 140B (step ST601).

Mobile station apparatus 140B then measures the reception strength of the transmission signal that is transmitted from base station apparatus 130B-1 and base station apparatus 130B-2 by using a control channel and determines the reception quality (or SIR) of the transmission signal from both base station apparatuses (step ST602).

Mobile station apparatus 140B then notifies, through base station apparatus 13013-1 or base station apparatus 130B-2 with which the link is established, base station control apparatus 120B of the reception quality of the transmission signal from base station apparatuses 13013 (step ST603). The control channel is a shared control channel that is constantly broadcasted by base station apparatuses 130B.

In base station control apparatus 12013, transmission frame formation control section 123B then determines whether every reception quality acquired from mobile station apparatus 11140B exceeds a prescribed level of reception quality (step ST604).

When every reception quality exceeds the prescribed level of reception quality (step ST604: YES), transmission frame formation control section 123B performs control for switching to a spatial multiplexing transmission mode (step ST605). When the reception qualities include ones that do not exceeds the prescribed level of reception quality (step ST604: NO), transmission frame formation control section 123B performs control for switching to a space-time encoding transmission mode (step ST606).

Specifically, when every reception quality exceeds the prescribed level of reception quality (step ST604: YES), transmission frame formation control section 123B transmits spatial multiplexing transmission selection information for selecting spatial multiplexing transmission to control information assigning section 124B and frame formation section 321.

When the reception qualities include those that do not exceed the prescribed level of reception quality (step ST604: NO), transmission frame formation control section 123B transmits space-time encoding transmission selection information for selecting space-time encoding transmission to control information assigning section 124B and frame formation section 321.

Control information assigning section 124B adds, to the data frame transmitted from transmission control section 122, the space-time encoding selection information or spatial multiplexing transmission selection information as header information in addition to the base station number information Nb from transmission frame formation control section 123B, and transmits the data frame to frame formation section 321.

In frame formation section 321, space-time encoding transmission selection information is acquired from transmission frame formation control section 123B, whereupon copying section 125 makes Nb copies of the data frame the space-time encoding transmission selection information is added to as header information acquired from control information assigning section 124B. A stream number assigned to each copied data frame is included in the sets of header information, each set of base station identification information from transmission frame formation control section 123E is also added to each copied data frame, and the data frames thus added to are outputted to base station IF section 126.

In frame formation section 321, spatial multiplexing transmission selection information is acquired from transmission frame formation control section 123B, whereupon series-parallel conversion section 221 generates Nb sub-data frames by series/parallel conversion. The frames are generated from data frames the spatial multiplexing transmission selection information is added to as header information acquired from control information assigning section 124B. The stream number assigned to each sub-data frame is included in header information of each sub-data frame, each set of base station identification information outputted from transmission frame formation control section 123B is added to the corresponding sub-data frame, and the sub-data frames are outputted to base station IF section 126.

Space-time encoding transmission or spatial multiplexing transmission is thus selected on the basis of reception quality that transmission frame formation control section 123B acquires from mobile station apparatus 140B and that indicates the propagation environment between communication-enabled base station apparatuses 130B and mobile station apparatus 140B, and copying section 125 or series-parallel conversion section 221 operates based on the selection information. Space-time encoding transmission and spatial multiplexing transmission are thereby adaptively switched.

The base station apparatuses 130B then receive a wired transmission frame in which spatial multiplexing transmission selection information or space-time encoding transmission selection information is included as header information in control information assigning section 124B. Control information extraction section 135 then extracts the spatial multiplexing transmission selection information or space-time encoding transmission selection information, and when the selection information included in the header is space-time encoding transmission selection information, a command signal that causes space-time encoding section 137 to operate is transmitted to radio frame processing section 331. When the selection information included in the header is spatial multiplexing transmission selection information, a command signal is transmitted that spatial multiplexing section 231 to operate.

space-time encoding section 137 and spatial multiplexing section 231 operate by receiving, from control information extraction section 135, a command signal that causes space-time encoding section 137 or spatial multiplexing section 231 to operate. Space-time encoding transmission and spatial multiplexing transmission are thereby switched.

Similar to radio communication system 100, it is sometimes impossible in radio communication system 100B to ignore the difference in the times at which the transmission signals transmitted from the plurality of base station apparatuses 130B reach mobile station apparatus 140B with respect to the symbol timing, and the characteristics of space-time encoding transmission and spatial multiplexing transmission are expected to deteriorate in this case. The characteristics of space-time encoding transmission and spatial multiplexing transmission in radio communication system 100B can be prevented from deteriorating by applying the method described in Embodiment 1 whereby the reception timing of the radio frames is brought to within a prescribed time difference.

Radio communication system 100B may also utilize the method of control described in Embodiment 1 whereby the reception quality of the transmission signal transmitted from the plurality of base station apparatuses to mobile station apparatus 140B is brought to a prescribed level, and the difference in reception levels is brought to within a prescribed level difference.

In base station control apparatus 120B in radio communication system 100B of the present embodiment, space-time encoding transmission or spatial multiplexing transmission is selected based on a reception quality that indicates the propagation environment between mobile station apparatus 140B and base station apparatuses 130B, and this selection information is the basis upon which copying section 125 or series-parallel conversion section 221 forms a wired transmission frame for transmission to base station apparatuses 130B. Specifically, when the reception quality is good, spatial multiplexing transmission is selected, and copying section 125 operates. When the reception quality is poor, space-time encoding transmission information is selected, and series-parallel conversion section 221 operates.

Space-time encoding transmission information or spatial multiplexing transmission information is included as switching control information in the header of the wired transmission data frame that is transmitted from base station control apparatus 120B to base station apparatuses 130B.

In base station apparatuses 130B, space-time encoding section 137 or spatial multiplexing section 231 operates based on the space-time encoding transmission information or spatial multiplexing transmission information that is the switching control information included in the header.

Specifically, in radio communication system 100B, adaptive switching of space-time encoding transmission and spatial multiplexing transmission is performed based on the propagation environment between base station apparatuses 130B and mobile station apparatus 140B. Specifically, when the propagation environment is favorable, a switch to space-time encoding transmission is made, and when the propagation environment is unfavorable, a switch to spatial multiplexing transmission is made.

Accordingly, spatial multiplexing transmission in which an enhanced transmission rate can be expected is performed when the propagation environment is favorable, and space-time encoding transmission is performed when the propagation environment is unfavorable and the reception quality is reduced. The communication quality of the system as a whole is therefore enhanced, and the throughput can be increased.

In the description of the present embodiment, switching between space-time encoding transmission and spatial multiplexing transmission was controlled according to the propagation environment, but a routine tailored to the QoS of transmission data for the mobile station apparatus may be added as another control method. In this case, control may be added for performing space-time encoding transmission rather than spatial multiplexing transmission even when the propagation environment is favorable in such cases as when the required rate of transmission data is low, the transmission data are not real-time data, or the amount of data to be transmitted is small. The transmission power required from the base station apparatuses can thereby be reduced, and the amount of interference imparted to other cells can be reduced, thus contributing to improved throughput in the whole system.

Other Embodiments (1) In the description of Embodiment 1 and Embodiment 3, a single space-time-encoded stream was transmitted by a single antenna from the communication-enabled base station apparatuses 130. However, the present invention is not limited by this configuration, and when the communication-enabled base station apparatuses 130 have a plurality of antennas, directional properties may be formed so that transmission of a space-time-encoded signal series is directed towards the desired mobile station apparatus 140. Improved communication quality can be anticipated by enhancing the directional gain in this case.

(2) In the description of Embodiment 1, a single space-time-encoded stream was transmitted from the communication-enabled base station apparatuses 130. However, the present invention is not limited by this configuration, and when the communication-enabled base station apparatuses 130 have a plurality of antennas and can transmit a plurality of streams, a plurality of space-time-encoded streams may be transmitted from a single base station apparatus 130. It is thereby possible to take advantage of the spatial degree of freedom of each of base station apparatuses 130 that can communicate, thereby resulting in an even further increase in the spatial diversity effect of transmission.

In a specific description with reference to FIG. 2, transmission frame formation control section 123 of base station control apparatus 120 communicates with base station apparatus 130 and totalizes the number Nm(k) of transmittable streams in all of base station apparatuses 130-1 to 130-Nb that can communicate via base station IF section 126. The Nm(k) herein is the number of transmittable streams in the kth communication-enabled base station apparatus 130-k, wherein k is a natural number from 1 to Nb.

As a result, when the total NL of Nm(k) exceeds Nb, at least one of the communication-enabled base station apparatuses 130 is capable of transmitting a plurality of streams.

In such cases, copying section 125, based on the base station number information NL from transmission frame formation control section 123, makes NL copies of the data frame outputted from control information assigning section 124. An integer from 1 to NL is uniquely assigned in an amount of Nm(k) as a stream number Ns in sequence to the data frames that are transmitted to the kth base station apparatus 130-k and that are the NL copies of the data frame. The stream number Ns assigned to each copied data frame is included in (added to) each set of header information, each set of base station identification information from transmission frame formation control section 123 is also added to each copied data frame, and the data frames thus added to are outputted to base station IF section 126. A plurality of stream numbers that corresponds to the number of sets of header information is included in the header information of the copied data frames sent to base station apparatuses 130 that transmit the abovementioned plurality of streams.

In base station apparatus 130, control information extraction section 135 extracts the base station number information NL and the stream number Ns from the control information included in the header of the copied data frame from buffer read-out section 134, and transmits the base station number information NL and the stream number Ns to space-time encoding section 137. Radio frame generation section 136 deletes the header information of the copied data frame that was transmitted from buffer read-out section 134, extracts the data body, adds a prescribed pilot symbol and control information used for the radio propagation channel to the data body, and generates a radio frame. The radio frame is transmitted to space-time encoding section 137.

space-time encoding section 137 performs the following operations by using the output (stream number Ns and the information NL indicating the number of communication-enabled base stations) of control information extraction section 135 and the output of radio frame generation section 136.

Specifically, space-time encoding section 137 does not perform space-time encoding for an inputted radio frame when the base station number information NL outputted from control information extraction section 135 is 1. Accordingly, after a prescribed communication path encoding is performed for transmission in a radio propagation channel, the radio frame is modulated according to a prescribed modulation method, converted to a radio frequency band, and transmitted from antenna 138.

When the base station number information NL outputted from control information extraction section 135 is 2 or higher, space-time encoding section 137 performs channel encoding of the inputted radio frame according to the stream number Ns and forms a space-time encoding series. However, when there is a plurality of stream numbers assigned, i.e., when base station apparatus 130 transmits a plurality of streams, base station apparatus 130 generates and transmits a plurality of space-time encoding series on the basis of a predetermined method of generating a space-time encoding.

When a plurality of encoded streams is transmitted from base station apparatus 130, the base station number information Nb and the stream number Ns are each included in the header of the wired transmission frame, and the wired transmission frame is transmitted to base station apparatus 130. However, the present invention is not limited by this configuration, and a configuration may also be adopted in which the pair composed of the stream number Ns (one or a plurality of stream numbers Ns) and the number NL of base stations that can communicate is correlated with pair identification information, and the pair identification information is included in the header of the wired transmission frame and transmitted to base station apparatuses 130. In this ease, a table in which the pairs of base station numbers NL and stream numbers Ns are correlated with pair identification information must be stored in advance in base station apparatuses 130. Control information extraction section 135 extracts the pair identification information included in the header of a sub-data frame that is outputted from buffer read-out section 134, references the abovementioned table using the pair identification information as a key, and outputs the corresponding base station number Nb and stream number Ns to space-time encoding section 137.

(3) In Embodiment 1 and Embodiment 3, base station apparatuses 130 transmitted a space-time-encoded signal series using space-time encoding section 137, but when a multi-carrier transmission such as OFDM is used, a spatial frequency encoding section may be provided instead of space-time encoding section 137 and used to transmit a spatial-frequency-encoded signal series. The encoding thus performed varies in the sub-carrier direction instead of the temporal axis direction, and the effects that can be obtained are the same as the effects of using space-time encoding. A disclosure relating to spatial frequency encoding is found in K. F. Lee and D. B. Williams, "Space-Frequency Transmitter Diversity Technique for OFDM Systems," IEEE Globecom 2000, Vol. 3, 2000, pp. 1473-1477, and a detailed description of spatial frequency encoding will not be given herein.

The present application is based on Japanese Patent Application No. 2004-234523, filed on 11 Aug. 2004, and Japanese Patent Application No. 2005-207800 filed on 15 Jul. 2005, the entire content of which is expressly incorporated herein by reference.

INDUSTRIAL APPLICABILITY

The present invention can be used as a communication system, a base station control apparatus, and a base station apparatus that enhance communication quality.

The invention claimed is:

1. A base station apparatus comprising:
   a modulation signal generator that selects a transmission method to transmit transmission data addressed to a mobile station apparatus and generates a modulation signal according to the selected transmission method; and
   a transmitter that transmits the modulation signal as one or more streams,
   wherein the modulation signal generator generates the modulation signal using control information on the transmission method coordinated with one or more other base station apparatuses.

2. The base station apparatus according to claim 1, wherein the control information is information on a reception quality at the mobile station apparatus.

3. The base station apparatus according to claim 1, wherein same data is included in transmission data from the base station apparatus and transmission data from the one or more other base station apparatuses to the mobile station apparatus.

4. The base station apparatus according to claim 1, wherein the modulation signal generator generates a modulation signal that is space-time encoded from the transmission data using the control information.

5. The base station apparatus according to claim 1, wherein the modulation signal generator generates a modulation signal that is spatial-frequency encoded from the transmission data using the control information.

6. The base station apparatus according to claim 1, wherein the modulation signal generator generates a modulation signal to be spatial-multiplexing transmitted from the transmission data, using the control information.

7. The base station apparatus according to claim 1, wherein the control information further includes information on a communicable mobile station apparatus.

8. The base station apparatus according to claim 1, wherein the control information further includes information on a number of communicable mobile station apparatuses.

9. The base station apparatus according to claim 1, wherein the one or more streams includes a known pilot signal.

10. A transmission signal generating method comprising:
    selecting a transmission method to transmit transmission data addressed to a mobile station apparatus and generating a modulation signal according to the selected transmission method; and
    transmitting the modulation signal as one or more streams, wherein the modulation signal is generated using control information on the transmission method coordinated with one or more other base station apparatuses.

11. A mobile station apparatus comprising:
a receiver that receives one or more streams; and
an estimator that generates a channel estimate using the received one or more streams; and
a decoder that decodes the received one or more streams using the channel estimate,
wherein the received one or more streams is a signal generated by the transmission method which a plurality of base station apparatuses selected in coordination.

12. The mobile station apparatus according to claim 11, further comprising a transmitter that transmits reception quality information generated using the received one or more streams, to the plurality of base station apparatuses.

13. A reception method comprising:
receiving one or more streams;
generating a channel estimate using the received one or more streams; and
decoding the received one or more streams using the channel estimate,
wherein the received one or more streams is a signal generated by the transmission method which a plurality of base station apparatuses selected in coordination.

* * * * *